United States Patent Office 2,909,432
Patented Oct. 20, 1959

2,909,432

FLUID SHORTENING

Lino L. Linteris, Demarest, N.J., assignor to Lever Brothers Company, New York, N.Y., a corporation of Maine No Drawing. Application February 11, 1957
Serial No. 639,222

8 Claims. (Cl. 99—118)

This invention relates to a shortening composition for use in baking and frying and the methods of making it, and relates specifically to stable fluid shortening compositions which will produce high volume cakes having tender crust, even close grain, and soft texture, and to the preparation of such shortenings.

Shortenings heretofore available for baking have included natural fats which are solid or plastic at room temperatures, including fatty animal tissues, butter and lard; compounded or blended shortenings, made from mixtures of naturally hard fats or hydrogenated vegetable oils with liquid, soft or partially hydrogenated vegetable oils; all-hydrogenated shortenings made by selectively hydrogenating a blend of liquid vegetable oils to obtain the desired finished properties; and superglycerinated shortenings which are generally all-hydrogenated shortenings containing an increased proportion of combined glycerol, in the form of mono- and di-glycerides, primarily monoglycerides, over that found in ordinary fat.

Liquid oil such as cottonseed, soybean, olive, rapeseed, corn oil, and sunflower seed oil may be treated by a "winterizing" process known in the prior art and described hereinafter to remove ingredients which tend to precipitate and settle out at low temperatures and sometimes cause the oil to congeal. The materials so produced are known as salad oils. Recently liquid oils, particularly salad oils, have been recommended for the preparation of a particular variety of cakes, but such oils are not suitable for the preparation of conventional high volume cakes containing a high ratio of sugar to flour. Cakes of this type having an even close grain, tender crust and a soft texture are in the greatest demand among consumers whether home baked or commercially prepared. These qualities are obtainable to the highest degree with all-hydrogenated superglycerinated plastic shortenings.

The superior performance of plastic shortenings in cake-making results to a large degree from their ability to entrap and hold considerable quantities of air during the mixture of batters and doughs. This air contributes a leavening action to the baking process. This trapping of air by fat in mixing batters and doughs is referred to as creaming. Liquid shortenings such as salad oils heretofore available do not have good creaming action.

Superglycerinated plastic shortenings are more efficient than other plastic shortenings in producing cakes having optimum properties due to the effectiveness of the monoglycerides as emulsifiers which promote the thorough and fine dispersion of the fat in the batter, thus resulting in a high degree dispersion of the desirable entrapped air. Plastic shortenings have the disadvantage, however, that they are difficult to measure, and consumers would welcome a liquid shortening which could be readily measured and poured, provided it could approach or meet the cake-making performance of superglycerinated shortenings.

Liquid oils are known to disperse in batters and doughs in the form of spherical droplets which have less surface in contact with the other batter ingredients than do plastic shortenings which disperse in sheets and films. Thus, even the addition of monoglycerides to salad oils and other liquid oils at levels which do not interfere with fluidity, is of little value in improving the performance of salad oils and does not produce a shortening with cake-making performance equal to that of plastic superglycerinated shortenings.

Cake ingredients may be combined in any one of several ways. One of the oldest and perhaps the most common is first to mix or "cream" the shortening and sugar, followed by the addition of eggs and then alternate portions of flour and milk, the salt and baking powder being added with the flour. This is called the creaming method and it is described in greater detail below.

The next most common method is first to mix the shortening and flour followed by the sugar and then the eggs and milk together. This is a so-called "blending" method, and is also described in greater detail below.

Other ingredient addition orders are possible but regardless of the mixing method it is necessary that the fat particles in the final batter (which is an oil in water type emulsion) shall contain small air bubbles. The volume of the final cake can be varied by the amount of baking powder added but unless these air bubbles of microscopic size are present in the fat phase of the batter, the cake will be coarse grained, tough crusted, and hard textured.

When the creaming method is used the air bubbles in the batter are large and the batter volume, which is the reciprocal of the specific gravity, is high if the cake is to be good. When the blending method is used the air bubbles in the batter are smaller and the batter volume has less significance although aeration of the batter in mixing is fully as important. Proper aeration of the batter is reflected in higher cake volumes. In the case of the creaming method there is a fairly good correlation between batter volume and cake volume. In the blending method, fineness rather than degree of aeration is most important and correlation between batter volume and cake volume is less significant. This function of air in batter fat is well known in the art and is discussed extensively in Alton E. Bailey, Industrial Oil and Fat Products, 2nd edition (1951), Interscience Publishers, at pages 295–304, and in an article by G. T. Carlin published in Cereal Chemistry, vol. 21, pages 189–199 (1944).

Different laboratories and bakeries vary considerably in their methods of expressing their judgment of cakes. Whatever evaluation method is used the characteristics desirable in cakes are generally recognized in industry and in the home. Descriptions of cake scoring methods may be found, for example, in the article by O. E. Stamberg in Cereal Chemistry, vol. 16, page 764 (1939), and the article by F. Hanning in Cereal Chemistry, vol. 29, page 177 (1952). In this laboratory cakes are scored on the basis of crust, grain and texture. Crust ratings are very tender, tender, medium tender, slightly tough, and tough. Grain ratings are even, very slightly uneven, slightly uneven, and uneven in any combination with open, slightly open, very slightly open, close, very slightly tight, slightly tight or tight. Texture ratings are soft, medium soft, medium hard, and hard. An all-hydrogenated superglycerinated plastic vegetable shortening may be expected to yield a cake having a tender crust, and even close grain, and soft texture.

I have discovered that stable fluid shortening compositions which will produce cakes comparable to those produced with all-hydrogenated superglycerinated plastic shortenings can be prepared by incorporating in a liquid oil from about 1 to about 8% by weight, of a stearine containing polyacid triglycerides, that is, a triacid triglyceride, or a mixture of diacid triglyceride and triacid triglyceride, having at least 25 mol percent of the triacid triglyceride based on the stearine. While the compositions of my invention containing from 1 to 8% by weight of such a stearine show good cake-making properties, the compositions having substantially more than about 5% of these stearines become somewhat thickened when standing, though still pourable on standing for periods of one week or more. Hence, the preferred compositions from the standpoint of good fluidity and cake-baking properties have 3.5–6.0% of the stearine.

The polyacid triglycerides which may be used effectively in the fluid shortening composition of the invention are described by the following structural formula:

$$(C_3H_5O_3)R_1R_2R_3$$

where $R_1$ is the acyl group of a saturated fatty acid having 20 to 26 carbon atoms, and $R_2$ and $R_3$ are each acyl groups of saturated fatty acids having 16 to 26 carbon atoms, and at least one of $R_2$ and $R_3$ is different from $R_1$. As heretofore indicated, the identity of the groups $R_1$, $R_2$ and $R_3$ are such that at least 25% of the additive to the liquid edible oil is a triacid triglyceride, that is a compound or compounds in which $R_1$, $R_2$ and $R_3$ are different from each other. Preferably the amount of triacid triglyceride is at least 40 mol percent of the stearine. Examples of triacid triglycerides that may be used in the compositions of the invention include the glyceride of arachidic ($C_{20}$), stearic ($C_{18}$), and palmitic ($C_{16}$) acids (arachidyl stearyl palmityl triglyceride); and lignoceryl stearyl palmityl triglyceride; or mixtures of these materials. Examples of diacid triglycerides that may be used include arachidyl distearyl triglyceride, behenyl distearyl triglyceride, lignoceryl dipalmityl triglyceride or mixtures of these diacid triglycerides with each other or with other similar diacid triglycerides withn the definition set forth above. Although the polyacid triglyceride may be prepared by a variety of procedures including known chemical syntheses, or by interesterification followed by separation of the desired polyacid triglycerides, it is preferred to prepare the additives by a solvent winterization process from peanut oil. It has been discovered that in the process of preparing a salad oil from peanut oil, a more saturated residue fraction (winter oil stearine fraction) remains, which after hydrogenation is quite satisfactory as a fluid shortening ingredient. A fluid shortening containing this ingredient retains its fluidity for extended periods of time at room temperatures and, in addition, has good cake-mixing properties. Dispersions containing the designated stearines, when used as the shortening ingredient of cake batters, cause the batter to incorporate additional air while being mixed and thus contribute desirable qualities to baked cake. It has been found that stearines that come directly from fish oils, i.e. without fractionation, designated herein as "fish oil stearines" do not produce satisfactory fluid shortenings from the standpoint of baking characteristics. However, the polyacid triglyceride components of fish oils alone or in mixtures when separated from the fish oil by fractionation, may be used in the stearine compositions of the invention.

To prepare the desirable fraction from the peanut oil, a variation of the solvent crystallization method of Boucher and Skau (J.A.O. C.S. 28, 501 (1951)) is used. For example, a mixture is formed containing by weight 33.3% peanut oil, 56.7% acetone and 10.0% hexane. This is cooled to −15° C. for 16 hours and filtered. The filtrate is a peanut "salad oil" and is obtained in a yield of 92%. The precipitated "winter oil stearine" fraction, designated hereinafter as "Fraction A" is obtained in a yield of 8% and has an iodine value (I.V.) of about 75 to 85. A reprecipitation is then carried out by redissolving the Fraction A in the same acetone-hexane solvent in a ratio of 1:5 oil/solvent. This solution is allowed to stand for 16 hours at −15° C. for the stearine to reprecipitate. A less saturated winter oil stearine (Fraction C) is obtained in 4% yield. The desired winter oil stearine showed that hte mixture contained the following combined fatty acids, the proportions being expressed in terms of the methyl esters and on a weight basis.

| | Percent |
|---|---|
| $C_{14}$ | 1 |
| $C_{16}$ | 18.5 |
| $C_{18}$ | 57.8 |
| $C_{20}$ | 9.0 |
| $C_{22}+C_{24}$ | 13.7 |

The comparative compositions of the original peanut oil and of Fraction B are presented in the following Table I.

TABLE I

*Composition of peanut oil and the winter-oil stearine fractions derived therefrom*

| | | Original Oil | Fraction B | |
|---|---|---|---|---|
| Iodine Value (I.V.) | | 91 | 57 | |
| Thiocyanogen Value (T.V.) | | 69 | 46 | |
| Saponification Value (S.V.) | | 190 | 190 | |
| Fatty Acids | | Percent [1] | Wt. Percent | Mol Percent |
| Myristic | $C_{14}$ | 0.5 | 1.0 | 1.3 |
| Palmitic | $C_{16}$ | 7.8 | 18.5 | 20.7 |
| Stearic | $C_{18}$ | 3.1 | 4.4 | 4.5 |
| Arachidic | $C_{20}$ | 2.4 | 9.0 | 8.2 |
| Behenic | $C_{22}$ | 3.1 | } 13.7 | 11.0 |
| Lignoceric | $C_{24}$ | 1.1 | | |
| Oleic | $C_{18}$ | 56.0 | 40.8 | 41.4 |
| Linoleic | $C_{18}$ | 26.0 | 12.6 | 12.9 |

[1] Hilditch, J. Soc. Chem. Ind. 64, 204 (1945).

Inasmuch as the stearine is a complex mixture of triacid, diacid and monacid triglycerides, the analytical process for estimating the amount of triacid triglycerides is also complex. The method of making the estimate for the present materials is disclosed in the first part of the publication of Handschumaker et al. (Oil and Soap 20, 183 (1943)). Essentially this method concentrates the disaturated triglycerides by acetone fractional crystallization to remove all the triunsaturated triglycerides and most of the diunsaturates. Using the following assumptions, which are considered valid on the basis of existing literature data, the content of disaturated triglycerides can be estimated. (1) Peanut oil contains substantially no trisaturated triglycerides; (2) the preponderant amount of unsaturation is present in the $C_{18}$ fatty acids; and (3) all of the triunsaturates have been removed. Then Percent olein = 2.525 (T.V.) − 1.348 (I.V.)
Percent linolein = 1.246 (I.V.) − 1.253 (T.V.)
Percent saturated = 100 − (percent olein + percent linolein)
 $x$ = percent monosaturated triglycerides
 $y$ = percent disaturated triglycerides
Then, $$x+y=100$$
$$\tfrac{1}{3}x+\tfrac{2}{3}y=\text{percent saturated}$$

On hydrogenation to low iodine values, the unsaturated acid groups yield predominantly stearates; thus the triacid triglycerides are formed from the disaturates and diacid triglycerides are formed from the monosaturates. Therefore, an estimate of the polyacid triglyceride content can be made in this way. In computing the triacid triglyceride content an allowance for the stearates is made by subtracting from the disaturated triglyceride a quantity coresponding with the stearate content as estimated from the distillation data appearing in Table I.

The term "stearine" is commonly used to designate hydrognated triglycerides. From the standpoint of baking performance, the stearines which are used in the present invention should have an iodine value of below about 20 and preferably in the range 0 to about 10. They may be obtained, for example, by hydrogenating to an iodine value of below about 20 the stearines obtained by the solvent winterization of peanut oil by the method described above.

The fluidity of the triacid triglyceride compositions is surprising, since the prior art has assumed that higher melting glycerides, of which the triacid triglyceride and diacid triglyceride employed according to the invention would be an example, are to be avoided in liquid oil products for consumer use due to the expectation that they would be unstable, i.e., would cause gelation and/or separation of solids on standing. While it is known that certain hydrogenated vegetable oils, namely, those which have strong beta polymorphic crystalline phase forming tendencies, such as sunflower seed oil, linseed oil, hazelnut oil, soybean oil, peanut oil, olive oil, corn oil and lard, can be suspended in liquid oils to yield a relatively stable fluid product, these stearines are only very slightly effective in cake-making. The polyacid triglycerides of this invention, which are strong beta-prime formers when cooled by themselves, unexpectedly are effective in forming stable suspensions regardless of their crystal phase when cooled in a solution. When precipitating from oil solution, the polyacid triglycerides have a strong tendency to come out of solution in a stable beta-2 form. This inherent property of coming out of solution in the stable beta-2 form is very desirable for it minimizes the tendency for resolidification or coarse graining out which occurs with other stearines such as cottonseed or palm oil stearines.

Any liquid vegetable oil may be used in the compositions of the invention including cottonseed, soybean, corn, olive and peanut among others as well as slightly hydrogenated liquid variations thereof. In order to prepare fluids of improved stability, however, it is preferable to utilize a salad oil, i.e., an oil prepared by "winterizing" the liquid oil. This is particularly true in the case of cottonseed oil. The "winterizing" process can be carried out by slowly cooling the oil under conditions which will allow the precipitation and clean separation of crystalline high melting glycerides. Even after winterization some settling frequently takes place. Corn oil, the other major source of salad oils, is preferably freed of its wax content to avoid possible settling at low temperatures since this settling may be unattractive to consumers.

Satisfactory dispersions of the polyacid triglycerides can be prepared by allowing a melt (at 80° C.) of the stearine-liquid oil blend to cool for 16 to 20 hours to about 29° C. and maintaining during this period of time an ambient temperature of 29° C. Under these conditions the stearine crystallizes from solution in a very fine particle size.

In order to have the desired fluidity and pourability, the viscosity of the blend should be not greater than 5000 centipoises as measured on a Brookfield viscosimeter at 70° F. using No. 3 spindle at 12 r.p.m. It is preferred that the compositions have a viscosity not greater than 4000. These conditions are maintained for the purpose of providing a composition that will be pourable in the temperature range of 70–85° F. The particle size is preferable small so that the mixture is substantially non-settling. Although a crystallization procedure has been described for preparing the compositions, they can alternatively be prepared by grinding the stearine with Dry Ice in a hammer mill and adding the powder to the liquid oil. The latter method yields somewhat stiffer but satisfactorily pourable compositions even though additional ingredients (mentioned hereinafter) are present. However, the crystallization procedure for preparing the fluid shortening compositions of the invention is prefered.

Although as previously indicated the monoglyceride emulsifiers show little or no improvement in the cake-making performance of liquid oils, in combination with the compositions of this invention containing polyacid triglyceride stearines, these emulsifiers yield a fluid shortening having cake-making performance noticeably exceeding those of the same oil without the emulsifiers. Monoglyceride emulsifiers are well known to those skilled in the art and are available from various suppliers. For the purposes of this invention I prefer the monoglycerides of saturated fatty acids. Lard stearine distilled monoglycerides are particularly suitable and an emulsifier of this type is available under the trade name "Myverol 18:00" (melting point 72.3° C.). I may also use emulsifiers which are mixed monoglycerides of the fatty acids of liquid oils such as cottonseed oil. An emulsifier of this type is commercially available under the trade name "Myverol 18:85" (melting point 52.7° C.). Sunflower seed oil mono- and di-glyceride emulsifiers are also effective (melting point 39.5° C.). Whatever mono or mono- and di-glyceride emulsifier is used it may be incorporated in the compositions of the invention at a level of from 0.5 to 5% by weight of the composition depending on the emulsifier used. Generally the tolerance of the lower melting emulsifier is greater. However, I prefer to use from 0.4 to 1.5% of the lard stearine distilled monoglyceride emulsifier.

It has been observed that at certain concentrations of the stearine containing polyacid triglyceride in the fluid shortening, e.g., 5% for the $C_{20}C_{18}C_{16}$ material, hydrogenated distilled monoglycerides may precipitate out of solution in rather large clusters (about 100 microns), which appear to be agglomerates of smaller crystals. At concentrations of 6 to 8% of the stearine, however, fine dispersions are formed even with the monoglyceride emulsifier present. To effect disintegration of any clusters present, a "Waring Blendor" may be used as a mechanical comminuting apparatus. Other equipment, such as colloid mills or homogenizers, may be used if proper precautions are taken to prevent local overheating during the processing. It should be pointed out that over-homogenization, local overheating during comminuting, or improper cooling rates during crystallization can all produce inferior cake-making performance of the resultant dispersion.

Most of the fluid shortening dispersions of the invention can be made to occlude up to about 15% (by volume) of gas by processing in a Waring Blendor, or similar means. For most purposes this gas is undesirable even if it is an inert gas such as nitrogen. However, some processing methods may incorporate smaller percentages of gas, which can be useful in preventing the settling of solids, and need not necessarily be removed.

Beta phase soybean oil stearines alone yield compositions of no greater fluidity than the triacid triglyceride oil stearines having equal proportions of up to 8% of each, and have no cake improving properties. I have found, however, that the addition to my compositions comprising triacid triglyceride, in particular, the $C_{20}C_{18}C_{16}$ types, of 1 to 8% by weight of soybean oil stearines having an iodine value of 1 to 22 further increases the stability of the compositions without adversely affecting their cake-making performance. These stearines may be powdered in a hammer mill with Dry Ice and then dispersed by mixing, or they may be coarsely ground and then reduced in size by passing through a colloid mill with part of the salad oil ingredient, and then added to the remainder of the composition.

The blending method designated above for testing cake-making capacity is carried out as follows:

| Formula | Yellow Cake | | White Cake | |
|---|---|---|---|---|
| | Grams | Volume | Grams | Volume |
| Flour—"Softasilk" | 200 | 2 cups | 200 | 2 cups. |
| Sugar—"Fruit-Fine" | 265 | 1¼ cups | 250 | 1¼ cups. |
| Baking Powder—"Calumet." | 10 | 2½ Tsp | 14 | 3½ Tsp. |
| Salt | 4 | 1 Tsp | 4 | 1 Tsp. |
| Shortening | 100 | ½ cup | 100 | ½ cup. |
| Whole Milk | 210 | 1 cup less 2 Tbsp. | 210 | 1 cup less 2 Tbsp. |
| Eggs (fresh) | 100 | 2 (whole) | 90 | 3 egg whites. |
| Vanilla | 6 | 1½ Tsp | 6 | 1½ Tsp. |

Sift flour, sugar, baking powder and salt into mixing bowl. Add shortening, vanilla, and two-thirds of the milk. Beat 2 minutes in electric mixer (Sunbeam "Mixmaster") at No. 4 speed. Scrape bowl and beater with a flexible rubber spatula. Add eggs and remaining milk, and mix 2 minutes at No. 4 speed. Again scrape and mix. Take batter volume. Scale 14 oz. (split batter into two portions for yellow cake) into each of two paper-lined and greased 8 inch layer cake tins. Bake yellow cakes at 375° F. for 24 minutes; 22 minutes at 360° F. for white cakes. Take cake volumes by standard method, and score the day after the cakes are baked.

The creaming method for making test cakes is carried out as follows:

| Formula | Grams | Volume Measure |
| --- | --- | --- |
| Flour—"Softasilk" | 200 | 2 cups. |
| Sugar—"Fruit-fine" | 200 | 1 cup. |
| Baking Powder—"Calumet" | 10 | 2½ Tsp. |
| Salt | 3 | ¾ Tsp. |
| Shortening | 100 | ½ cup. |
| Whole Milk | 180 | ¾ cup. |
| Eggs (fresh) | 100 | 2 (whole). |
| Vanilla | 4 | 1 Tsp. |

Cream sugar, salt and shortening 2 minutes in electric mixer (Sunbeam "Mixmaster") on No. 4 setting. Scrape bowl and add eggs. Mix 2 minutes on No. 4 setting. Scrape bowl. Add one-half of the milk, then sift in flour and baking powder and mix smooth. Add balance of milk, flour, and mix 1½ minutes. Take batter volume. Split batter into two 8 inch greased layer cake pans. Bake approximately 23 minutes at 375° F. Take cake volume and score the day after cakes are baked.

My invention is further illustrated by the following examples:

*Example 1*

Peanut oil was subjected to the solvent winterization process described above to produce a "Fraction A" and "Fraction B," which were then hydrogenated. Liquid shortenings were prepared by mixing such hydrogenated peanut oil-winter oil with various edible liquid oils. The shortenings were made by heating the mixture to 80° C. and cooling slowly to 29° C. for 16 hours, in an ambient temperature maintained at 29° C. Portions of the fluid shortening compositions were stored for one week at 70° F., and other portions at 95° F. for the same length of time. At the end of the week, observations were made on the fluidity of the shortenings. The results are summarized in Table II below.

TABLE II

| Sample No. | Composition | | | | | Fluidity, After One Week at— | |
| --- | --- | --- | --- | --- | --- | --- | --- |
| | Liquid Oil | | Stearine | | | | |
| | Type | Percent | Type | I.V. | Percent | 70° F. | 95° F. |
| Control 1 | Winterized CSO | 95 | CSO | 1 | 5 | Good | Fair. |
| Control 2 | do | 95 | SBO | 1 | 5 | do | Good. |
| Control 3 | do | 95 | PO | 1 | 5 | do | Solid. |
| Sample 1 | CSO | 95 | Fraction B [a] | 20 | 5 | do | Good. |
| Sample 2 | do | 95 | do. [a] | 2 | 5 | do | Do. |
| Sample 3 | do | 95 | Fraction A [b] | 4 | 5 | do | Solid. |

The subscripts and abbreviations used in the foregoing and other tables appearing in the specification are as follows:
[a] Hydrogenated 4% "Fraction B" from solvent winterization of peanut oil.
[b] Hydrogenated 8% "Fraction A" from solvent winterization of peanut oil.
[c] Molecularly distilled monoglycerides of fully hydrogenated lard.
[d] Molecularly distilled monoglycerides of cottonseed oil.
CSO—Cottonseed oil.
MSO—Mustard seed oil.
PO—Palm oil.
RSO—Rapeseed oil.
SBO—Soybean oil.
sl.—Slightly.
vs.—Very slightly.
med.—Medium.
cc.—Cubic centimeters.
vol.—Volume.
g.—Grams.
frac.—Fraction.
sec.—Seconds.

*Example 2*

The shortening compositions of Example 1 were used to prepare yellow layer cakes by the creaming method. The batter volumes were recorded, and the resulting cakes were rated as to volume, crust, grain, and texture, as shown in Table III:

TABLE III

| Sample No. | Batter, Vol. cc./g. | Cake, Volume cc. | Crust | Grain | Texture |
| --- | --- | --- | --- | --- | --- |
| Control 1 | 0.94 | 1,000 | Tough | Uneven coarse. | Med. hard. |
| Control 2 | 0.96 | 1,000 | do | do | Do. |
| Control 3 | 1.05 | 1,080 | Sl. tough | do | Med. soft. |
| Sample 1 | 0.90 | 1,040 | Tough | do | Hard. |
| Sample 2 | 1.21 | 1,200 | Tender | Even vs. coarse. | Soft. |
| Sample 3 | 1.03 | 1,110 | Sl. tough | Uneven sl. coarse. | Med. soft. |

It will be observed that the fluid shortening compositions containing 5% of the stearine of the invention produced substantially better cakes as compared with the controls. The batter aerating effect resulting from the polyacid triglyceride is particularly evident from the high batter volumes obtained. From a comparison of the cake baking action of Sample 1 and Sample 2, it can be concluded that an increase in iodine value from 2 to 20 results in decreased aerating action. Although it would be desirable to obtain a higher yield of triacid triglyceride from the peanut oil winterization process, the effect of too much contaminating monoacid triglyceride oil is evident in the test results on "Fraction A" (which is obtained in higher yield) in Sample No. 3. It is also apparent that stearines prepared from cottonseed, soyabean, and palm oils when added to winterized cottonseed oil to prepare fluid shortenings, produce poor cake-making results.

*Example 3*

Fluid shortening compositions were prepared from hydrogenated peanut oil winter oil stearine ("Fraction A"

or "Fraction B"), and cottonseed oils. Emulsifiers were also added, consisting of molecularly distilled monoglycerides of either cottonseed oil or fully hydrogenated lard. The shortenings were prepared by the method described in Example 1, that is, preparing a melt and allowing it to cool slowly to 29° C. Portions of each shortening were allowed to stand for one week at 50° F., 60° F., 70° F., or 95° F., and the fluidity of the composition was observed after that time. The results are presented in Table IV:

*Example 4*

Yellow layer cakes were prepared by the creaming method using the fluid shortening samples described in Table IV. The cake batter volumes were measured, and the cakes were rated for volume, crust, grain, and texture. The results are presented in Table V:

TABLE V

| Sample No. | Yellow Layer Cake (Creaming Method) | | | | |
|---|---|---|---|---|---|
| | Batter, Vol. cc./g. | Cake, Vol. cc. | Crust | Grain | Texture |
| Control 4 | 0.99 | 1,060 | Tough | Even coarse | Hard. |
| Control 5 | 0.98 | 1,050 | ----do---- | ----do---- | Do. |
| Control 6 | 0.90 | 1,065 | ----do---- | ----do---- | Do. |
| Sample 4 | 0.92 | 1,080 | ----do---- | ----do---- | Do. |
| Sample 7 | 0.92 | 1,035 | ----do---- | ----do---- | Do. |
| Sample 8 | 0.96 | 1,070 | ----do---- | ----do---- | Do. |
| Sample 9 | 1.04 | 1,145 | Sl. tough | Sl. uneven coarse | Med. hard |
| Sample 10 | 1.14 | 1,155 | Med. tender | Sl. uneven, Sl. coarse | Med. soft. |
| Sample 11 | 1.24 | 1,265 | Tender | Even v.s. coarse | 9Soft. |
| Sample 12 | 1.29 | 1,205 | ----do---- | ----do---- | Do. |
| Sample 13 | 1.14 | 1,205 | Med. tender | Uneven V. sl. coarse | Med. soft. |

*Example 5*

Using the fluid shortenings described in Table IV, yellow layer cakes were baked from batters prepared by

TABLE IV

| Sample No. | Composition | | | | | | Fluidity, after 1 week at— | | | |
|---|---|---|---|---|---|---|---|---|---|---|
| | Liquid Oil | | Stearine | | | Emulsifier | | 50° F. | 60° F. | 70° F. | 95° F. |
| | Type | Percent | Type | I.V. | Percent | Type | Percent | | | | |
| Control 4 | Winterized CSO Salad | 100 | | | | | | Good | Good | Good | Good. |
| Control 5 | CSO | 100 | | | | | | Fair | ----do---- | ----do---- | Do. |
| Control 6 | CSO | 98.8 | | | | 18-00° | 1.2 | Poor | ----do---- | ----do---- | Do. |
| Sample 4 | CSO | 96.6 | Frac. Bª | 20 | 2 | 18-00° | 1.2 | Solid | ----do---- | ----do---- | Do. |
| Sample 5 | CSO | 93.8 | Frac. Bª | 20 | 5 | 18-00° | 1.2 | ----do---- | ----do---- | ----do---- | Do. |
| Sample 6 | CSO | 90.8 | Frac. Bª | 20 | 8 | 18-00° | 1.2 | ----do---- | ----do---- | Solid | Do. |
| Sample 7 | CSO | 97.8 | Frac. Bª | 2 | 1 | 18-00° | 1.2 | Poor | Good | ----do---- | Do. |
| Sample 8 | CSO | 96.8 | Frac. Bª | 2 | 2 | 18-00° | 1.2 | Solid | ----do---- | ----do---- | Do. |
| Sample 9 | CSO | 95.8 | Frac. Bª | 2 | 3 | 18-00° | 1.2 | ----do---- | ----do---- | ----do---- | Do. |
| Sample 10 | CSO | 94.8 | Frac. Bª | 2 | 4 | 18-00° | 1.2 | ----do---- | ----do---- | ----do---- | Do. |
| Sample 11 | CSO | 93.8 | Frac. Bª | 2 | 5 | 18-00° | 1.2 | ----do---- | ----do---- | ----do---- | Do. |
| Sample 12 | CSO | 92.8 | Frac. Bª | 2 | 6 | 18-00° | 1.2 | ----do---- | ----do---- | ----do---- | Fair. |
| Sample 13 | CSO | 90.8 | Frac. Bª | 2 | 8 | 18-00° | 1.2 | ----do---- | Poor | ----do---- | Solid. |
| Sample 14 | CSO | 93.8 | Frac. Bª | 2 | 5 | 18-85ᵈ | 1.2 | | | ----do---- | Good. |
| Sample 15 | CSO Salad | 93.8 | Frac. Bª | 2 | 5 | 18-00 | 1.2 | Good | Good | ----do---- | Do. |
| Sample 16 | CSO | 93.8 | Frac. Aᵇ | 4 | 5 | 18-00 | 1.2 | | | ----do---- | Fair. |

It will be observed from Table IV that all of the shortenings, even that containing 8% of polyacid triglyceride, maintain a satisfactory fluidity at 70° F.

the blending method. The same measurements were made on the batter and on the cake as heretofore described, and the results are summarized in Table VI.

TABLE VI

| Sample No. | Yellow Layer Cake (Blending Method) | | | | |
|---|---|---|---|---|---|
| | Batter, Vol. cc./g. | Cake, Vol. cc. | Crust | Grain | Texture |
| Control 5 | 0.89 | 1,125 | Tough | Even coarse | Hard. |
| Control 6 | 0.86 | 1,115 | ----do---- | Uneven coarse | Do. |
| Sample 4 | 0.88 | 1,175 | ----do---- | Even coarse | Med. hard. |
| Sample 5 | 0.88 | 1,175 | Sl. tough | Uneven sl. coarse | Do. |
| Sample 6 | 0.92 | 1,205 | ----do---- | ----do---- | Do. |
| Sample 7 | 0.86 | 1,145 | ----do---- | ----do---- | Do. |
| Sample 8 | 0.87 | 1,190 | ----do---- | ----do---- | Do. |
| Sample 9 | 0.87 | 1,190 | ----do---- | ----do---- | Do. |
| Sample 10 | 0.88 | 1,190 | ----do---- | ----do---- | Do. |
| Sample 11 | 0.94 | 1,205 | Med. tender | Sl. uneven, sl. coarse | Med. soft. |
| Sample 12 | 0.94 | 1,215 | ----do---- | ----do---- | Do. |
| Sample 13 | 0.97 | 1,245 | ----do---- | ----do---- | Do. |
| Sample 14 | 0.97 | 1,205 | Tender | Sl. uneven close | Soft. |
| Sample 15 | 1.03 | 1,205 | Med. tender | Even close | Do. |
| Sample 16 | 0.89 | 1,230 | Sl. tough | Uneven sl. coarse | Med. soft. |

Example 6

Using the fluid shortenings described in Example 3 and Table IV, white layer cakes were baked from batters prepared by the blending method. The batters and cakes were graded, and the results of the measurements are presented in Table VII.

were made from batters prepared from these fluid shortenings by the blending method. The batter and cakes were rated according to the criteria described in the foregoing examples. The data show that treatment of the fluid shortening containing emulsifier, in the Waring

TABLE VII

| Sample No. | White Layer Cake (Blending Method) | | | | |
|---|---|---|---|---|---|
| | Batter, Vol. cc./g. | Cake, Vol.-cc. | Crust | Grain | Texture |
| Control 4 | 0.89 | 900 | Tough | Uneven coarse | Hard. |
| Control 5 | 0.87 | 825 | ----do---- | ----do---- | Do. |
| Control 6 | 0.85 | 925 | ----do---- | Even coarse | Do. |
| Sample 7 | 0.87 | 1,035 | Med. tender | Even close | Med. soft. |
| Sample 8 | 0.87 | 1,050 | ----do---- | ----do---- | Do. |
| Sample 9 | 0.89 | 1,040 | ----do---- | ----do---- | Do. |
| Sample 10 | 0.90 | 1,055 | ----do---- | ----do---- | Do. |
| Sample 11 | 1.02 | 1,060 | ----do---- | ----do---- | Do. |
| Sample 12 | 0.98 | 1,095 | ----do---- | ----do---- | Do. |
| Sample 13 | 1.00 | 1,070 | ----do---- | ----do---- | Do. |

Example 7

More fluid shortenings were prepared by adding hydro-

Blendor, produced a significant improvement in the quality of the cake.

TABLE VIII

| Sample No. | Composition | | | | | | Processing | | Yellow Layer Cake (Blending Method) | | | | |
|---|---|---|---|---|---|---|---|---|---|---|---|---|---|
| | Liquid Oil | | Stearine | | | | Emulsifier | | Batter, Vol. cc./g. | Cake, Vol. cc. | Crust | Grain | Texture |
| | Type | Percent | Type | I.V. | Percent | | Type | Percent | | | | | |
| 17 | CSO | 93.8 | Fraction B[a]. | 20 | 5 | | 18-00 | 1.2 As precipitated | 0.88 | 1,175 | Sl. tough | Uneven sl. coarse | Med. hard. |
| 18 | CSO | 93.8 | ---do.[a] | 20 | 5 | | 18-00 | 1.2 Dispersed with Waring Blendor for 20 sec. and vacuum de-aerated. | 1.01 | 1,220 | Med. tender. | Sl. uneven close | Soft. |
| 19 | CSO | 93.8 | ---do.[a] | 2 | 5 | | 18-00 | 1.2 As precipitated | 0.94 | 1,205 | ---do---- | Sl. uneven, sl. coarse. | Med. soft. |
| 20 | CSO | 93.8 | ---do.[a] | 2 | 5 | | 18-00 | 1.2 Dispersed with Waring Blendor for 20 sec. and vacuum deaerated. | 1.04 | 1,245 | ---do---- | Even close | Soft. |

(Sample size was either 500 g. or 1,000 g.)

genated peanut oil-winter oil stearine having iodine values of 2 and 20 ("Fraction B"), and hydrogenated lard monoglyceride emulsifier, to cottonseed oil. The method used to prepare these shortenings is essentially the same as described in Example 1. However, Samples 21 and 23 were processed in Waring Blendors for 20 seconds, to disperse large monoglyceride clusters that were formed, and then were de-aerated by vacuum. Yellow layer cakes Two "Fraction B" winter oil stearines were prepared from another sample of peanut oil, and analyses were carried out thereon following the fractionation procedure of Handschumaker et al. referred to above and the analysis for triacid triglyceride content in the refined "Fraction B" described above. "Sample Type I" was a relatively more pure material containing a high concentration of triacid triglyceride, while "Sample Type I" was less pure, containing a lower concentration of triacid triglyceride and a relatively high concentration of diacid triglyceride. The results are presented in Table IX.

TABLE IX

| Sample Type | I.V.[1] (Fraction B) | After Acetone Fractionation of Fraction B | | | Calculated Composition of "Refined Fraction B" | | | Estimated Triacid Triglyceride in Fraction B,[2] Percent |
|---|---|---|---|---|---|---|---|---|
| | | I.V.[1] | T.V.[1] | S.V.[1] | Olein, Percent | Linolein, Percent | Saturated Triglyceride | |
| I | 50.1 | 38.9 | 31.9 | 190 | 28 | 8 | 64 | 67 |
| II | 62.0 | 44.8 | 43.5 | 183 | 50 | 1 | 49 | 14 |

[1] Official methods of American Oil Chemists Society.
[2] After correcting for about 4% stearate (see Table I).

The data in Tables V, VI and VII show that substantial improvements in cake baking qualities are produced by adding even as little as 1% of polyacid triglyceride, as compared with the controls containing no additive. Shortenings containing as much as 8% polyacid triglyceride which still retain fluid properties, also had superior cake baking qualities. The two types of monoglyceride emulsifiers produced favorable results in the preparation and baking of yellow layer cakes by the blending method. The data in these tables also demonstrate the preferred range of 3.5 to 6.0% by weight of polyacid triglyceride in the fluid shortening.

A comparison of the data in Tables II, III, IV, V, VI and VII indicates that the level of emulsifier contained within limits, is not critical in preparing cake batters by the creaming method, but a level of 0.4 to 1.5% of hydrogenated lard distilled monoglycerides is preferred for fluidity reasons. By using "soft" emulsifiers for separate precipitation of the monoglycerides, greater quantities of emulsifiers can be incorporated, although no apparent benefit may be obtained thereby.

From the Table VIII data it can be inferred that the processing in the Waring Blendor followed by de-aeration tends to improve the cake-making performance of the formulae tested.

*Example 8*

Sample Type I which is listed in Table IX was hydrogenated and liquid shortenings were prepared by mixing such hydrogenated peanut oil-winter oil stearine with cottonseed oil or cottonseed salad oil by the procedure described in Example 1. An emulsifier was added consisting of 1.2% molecularly distilled monoglycerides of fully hydrogenated lard. Portions of fluid shortening compositions were stored for one week at 50° F., other portions at 60° F., other portions at 70° F. and still other portions at 95° F. all for the same length of time. Control determinations were also made on samples of the hydrogenated oil and liquid oil plus emulsifier. At the end of the week observations were made on the fluidity as measured by the viscosity of the shortenings. The results are summarized in Table X below.

The data in Table X demonstrate that all the samples had an acceptable pourability after storage for one week.

*Example 9*

The shortening compositions of Example 8 were used to prepare yellow cakes by the blending method. The batter volumes were recorded and the baking characteristics were rated as to volume, crust, grain and texture, as shown in Table XI below.

TABLE XI

| Sample | Batter, Vol.-cc.-gm. | Cake ||||
|---|---|---|---|---|---|
| | | Vol.-cc. | Crust | Grain | Texture |
| Control 7 | 0.85 | 1,125 | Tough | Uneven Coarse | Hard. |
| Control 8 | 0.90 | 1,140 | do | do | Do. |
| Control 9 | 0.85 | 1,125 | do | do | Do. |
| Sample 21 | 0.97 | 1,170 | Soft | Even Close | Soft. |
| Sample 22 | 0.94 | 1,170 | Med. Soft | Uneven V.Sl. Coarse. | Med. Soft. |

The results of Examples 8 and 9 show that hydrogenated "Fraction B" samples containing 67% of tri-acid tri-glyceride produce liquid shortenings which are superior to liquid oils with and without ordinary emulsifiers from the standpoint both of fluidity and baking characteristics.

Other variations and modifications of the invention will be apparent to those skilled in the art, and it is intended that all such varations and modifications shall come within the scope of the appended claims.

I claim:

1. A stable, fluid shortening composition comprising an edible liquid oil and about 1 to 8%, by weight, of a non-fish oil stearine comprising polyacid triglycerides of the formula:

$$(C_3H_5O_3)R_1R_2R_3$$

where $R_1$ is an acyl group of a fatty acid having 20 to 26 carbon atoms, $R_2$ and $R_3$ are acyl groups of fatty acids having 16 to 26 carbon atoms, at least one of $R_2$ and $R_3$ being different from $R_1$, and at least 25 mol percent of said stearine being tri-acid triglycerides in which $R_1$, $R_2$ and $R_3$ are different from each other, said stearine having an iodine value not greater than 20, said composition having a viscosity of not over 5000 centipoises at 70° F.

2. A composition as described in claim 1, wherein $R_2$ and $R_3$ are acyl groups of fatty acids having 16 to 18 carbon atoms.

3. A composition as described in claim 1, containing 3.5 to 6.5%, by weight, of said stearine.

TABLE X

| Sample | Composition |||||| Viscosity (cps.) [1] |||||
|---|---|---|---|---|---|---|---|---|---|---|---|
| | Liquid Oil || Stearine ||| After 24 hrs. at Room Temp. | After 1 week at— ||||
| | Type | Percent | Type (Table IX) | I.V. | Percent | | 50° F. | 60° F. | 70° F. | 95° F. |
| Control 7 | CSO | 100 | | | | 100 | 2,300 | 250 | 50 | 30 |
| Control 8 | CS-Salad | 100 | | | | 100 | 6,400 | 100 | 50 | 30 |
| Control 9 | CSO | 98.8 | | | | 150 | 6,400 | 4,400 | 4,800 | 100 |
| Sample 21 | CS-Salad | 93.8 | I | 0.4 | 5 | 1,700 | 3,200 | 2,500 | 2,800 | 3,400 |
| Sample 22 | CSO | 93.8 | I | 0.4 | 5 | 2,300 | 7,000 | 4,300 | 3,300 | 4,200 |

[1] Viscosity obtained with Brookfield Viscosimeter Model LVF with #3 spindle at 12 r.p.m.

4. A composition as described in claim 1, in which the stearine has an iodine value not greater than 10.

5. A composition as described in claim 1, in which the liquid oil is cottonseed oil.

6. A composition as described in claim 1, containing 0.5 to 5.0% of a monoglyceride emulsifying agent.

7. A composition as described in claim 1, in which said stearine is a hydrogenated stearine obtained by solvent winterization of peanut oil.

8. A composition as described in claim 1, in which said stearine has at least 40 mol percent of triacid triglycerides.

References Cited in the file of this patent

UNITED STATES PATENTS

| | | |
|---|---|---|
| 2,132,394 | Coith et al. | Oct. 11, 1938 |
| 2,521,242 | Mitchell | Sept. 5, 1950 |
| 2,815,285 | Holman et al. | Dec. 3, 1957 |
| 2,815,286 | Andre et al. | Dec. 3, 1957 |

OTHER REFERENCES

"Phase Relations Pertaining to the Solvent Winterization of Crude Peanut Oil in 85-15 Acetone-Hexane Mixture," by Boucher et al.

UNITED STATES PATENT OFFICE
CERTIFICATE OF CORRECTION

Patent No. 2,909,432                                              October 20, 1959

Lino L. Linteris

It is hereby certified that error appears in the printed specification of the above numbered patent requiring correction and that the said Letters Patent should read as corrected below.

Column 3, line 30, for "withn" read -- within --; line 72, for "hte" read -- the --; column 4, line 65, for "coresponding" read -- corresponding --; column 6, line 19, for "ben" read -- been --; column 12, line 60, for "high" read -- higher --.

Signed and sealed this 19th day of April 1960.

(SEAL)
Attest:

KARL H. AXLINE                                        ROBERT C. WATSON

Attesting Officer                                       Commissioner of Patents